United States Patent
Leahy et al.

(10) Patent No.: US 9,598,168 B2
(45) Date of Patent: Mar. 21, 2017

(54) METHOD OF ASSEMBLING AND BALANCING ROTOR BLADES

(71) Applicant: Sikorsky Aircraft Corporation, Stratford, CT (US)

(72) Inventors: Kevin P. Leahy, Naugatuck, CT (US); Frank Caputo, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 597 days.

(21) Appl. No.: 14/033,700

(22) Filed: Sep. 23, 2013

(65) Prior Publication Data

US 2015/0082634 A1 Mar. 26, 2015

(51) Int. Cl.
*B64C 27/00* (2006.01)
*B64C 27/473* (2006.01)
*B23P 15/04* (2006.01)
*G01M 1/32* (2006.01)
*F03D 1/00* (2006.01)
*G01M 1/34* (2006.01)

(52) U.S. Cl.
CPC .......... *B64C 27/008* (2013.01); *B64C 27/473* (2013.01); *B23P 15/04* (2013.01); *B64C 2027/4736* (2013.01); *F03D 1/008* (2013.01); *G01M 1/32* (2013.01); *G01M 1/34* (2013.01); *Y10T 29/37* (2015.01); *Y10T 29/49337* (2015.01); *Y10T 29/49771* (2015.01)

(58) Field of Classification Search
CPC ................ B64C 27/008; B64C 27/473; B64C 2027/4736; B64C 11/008; G01M 1/04; G01M 1/12; G01M 1/14; G01M 1/20; G01M 1/24; G01M 1/30; G01M 1/32; G01M 1/34; F03D 1/008; F01D 5/066; F01D 5/025; F01D 5/027; F04D 29/26; Y02T 50/671; Y02T 50/673; Y10T 29/49861; Y10T 29/49337; Y10T 29/49764; Y10T 29/49771; Y10T 29/49778; B23P 15/04
See application file for complete search history.

(56) References Cited

U.S. PATENT DOCUMENTS 2,620,884 A * 12/1952 Gluhareff .............. B64C 27/008
                                                    416/144
4,872,817 A * 10/1989 De Kruif ................ F01D 5/025
                                                    416/244 A
4,991,437 A * 2/1991 Hanchett ................ G01M 1/122
                                                    269/254 CS
5,475,622 A    12/1995 Reinfelder et al.
(Continued)

Primary Examiner — Sarang Afzali
(74) Attorney, Agent, or Firm — Cantor Colburn LLP

(57) ABSTRACT

A method of assembling a rotor blade assembly includes determining a first spanwise moment of a first component of the rotor blade assembly and comparing the first spanwise moment to a target first spanwise moment. The first spanwise moment of the first component is adjusted based on a result of the comparison. A second spanwise moment of a second component of the rotor blade assembly is determined and compared to a target second spanwise moment. The second spanwise moment of the second component is adjusted based on a result of the comparison. The first component is assembled to the second component, resulting in a rotor blade assembly meeting a target spanwise moment of the rotor blade assembly.

13 Claims, 4 Drawing Sheets

(56) References Cited

U.S. PATENT DOCUMENTS

| | | | |
|---|---|---|---|
| 5,628,621 A | * | 5/1997 | Toborg .................... F01D 5/066 416/198 A |
| 5,824,897 A | | 10/1998 | Beachum et al. |
| 5,862,576 A | | 1/1999 | Leahy et al. |
| RE37,774 E | | 7/2002 | Leahy et al. |

* cited by examiner

METHOD OF ASSEMBLING AND BALANCING ROTOR BLADES

GOVERNMENT RIGHTS STATEMENT

This invention was made with Government support under N00019-06-C-0081 awarded by the Department of the Navy. The Government has certain rights in this invention.

BACKGROUND

The subject matter disclosed herein generally relates to rotors for aircraft use. More specifically, the subject disclosure relates to balancing of main rotor blades of rotor craft.

For the rotor blade to operate properly in the dynamic environment in which it is used, the blade must meet requirements for balance so as to not result in excessive vibration levels when used in the rotorcraft. A typical rotor blade for a rotor craft, such as a helicopter or dual coaxial rotor rotorcraft is formed from several components including a spar with counterweights, a trailing edge pocket assembly including one or more skins, such as upper and lower skins, with a core therebetween, and a leading edge assembly including a leading edge sheath and other components. These components are typically secured to each other by a structural film adhesive bond and/or other fastener resulting in a blade assembly. Manufacture of the various components, and their assembly, introduces some variation in weight and weight distribution into the blade assembly. This variation is observed by measuring the weight and moments of the completed blade assembly via a balance procedure, often including a whirl fixture, in which the blade assembly is spun with a master rotor blade, having a selected weight and weight distribution. The rotation of the blade assembly is observed and compared to the master rotor blade, and any variation between the two is indicative of variation in weight or weight distribution of the blade assembly compared to the master rotor blade. Such variation is corrected in the blade assembly by removing material or counterweights, up to certain acceptable or feasible limits. The limits constrain how severe of an out of balance condition of the blade assembly can be corrected, resulting in potential of scrapping costly rotor blade assemblies.

BRIEF DESCRIPTION

In one embodiment, a method of assembling a rotor blade assembly includes determining a first spanwise moment of a first component of the rotor blade assembly and comparing the first spanwise moment to a target first spanwise moment. The first spanwise moment of the first component is adjusted based on a result of the comparison. A second spanwise moment of a second component of the rotor blade assembly is determined and compared to a target second spanwise moment. The second spanwise moment of the second component is adjusted based on a result of the comparison. The first component is assembled to the second component, resulting in a rotor blade assembly meeting a target spanwise moment of the rotor blade assembly.

In another embodiment, a method of assembling a rotor blade assembly includes determining a trailing edge pocket assembly spanwise moment of a trailing edge pocket assembly of the rotor blade assembly and comparing the trailing edge pocket assembly spanwise moment to a target trailing edge pocket assembly spanwise moment. The trailing edge pocket assembly spanwise moment of the trailing edge pocket assembly is adjusted based on a result of the comparison. A spar assembly spanwise moment of a spar assembly of the rotor blade assembly is determined and compared to a target spar assembly spanwise moment. The spar assembly spanwise moment of the spar assembly is adjusted based on a result of the comparison. The trailing edge pocket assembly is assembled to the spar assembly, resulting in a rotor blade assembly meeting a target spanwise moment of the rotor blade assembly.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
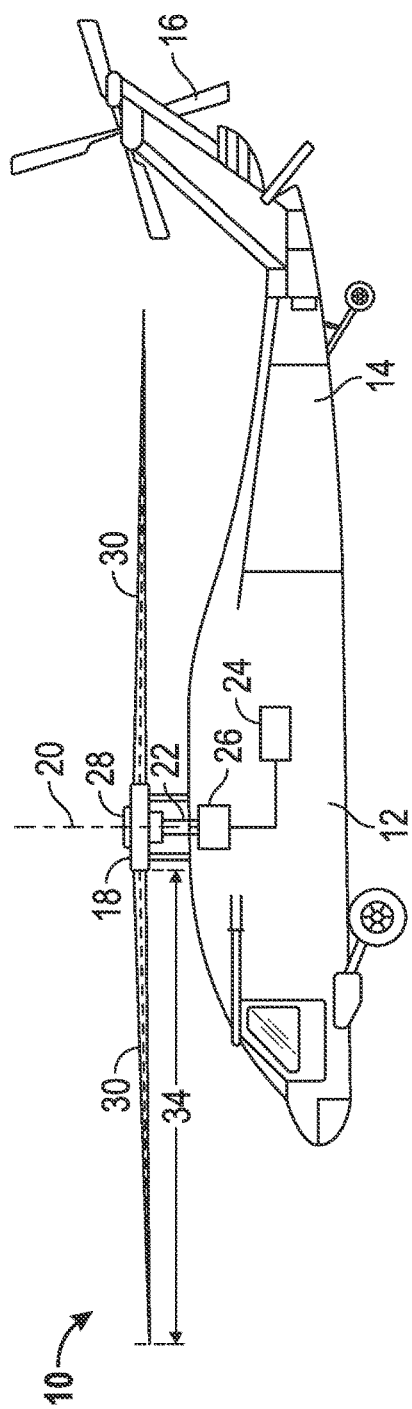
FIG. 1 is a schematic view of an embodiment of a rotary wing aircraft.

Shown in FIG. 1 is a schematic view of an embodiment of an aircraft, in this embodiment a helicopter 10. The helicopter 10 includes an airframe 12 with an extending tail 14 and a tail rotor 16 located thereat. While the embodiment of a helicopter 10 described herein includes an extending tail 14 and tail rotor 16, it is to be appreciated that the disclosure herein may be applied to other types of rotorcraft, such as dual coaxial rotor rotorcraft. A main rotor assembly 18 is located at the airframe 12 and rotates about a main rotor axis 20. The main rotor assembly 18 is driven by a drive shaft 22 connected to a power source, for example, an engine 24 by a gearbox 26. The main rotor assembly 18 includes a rotor hub 28 located at the main rotor axis 20 and operably connected to the drive shaft 22. A plurality of blade assemblies 30 are connected to the rotor hub 28.

Figure 2:
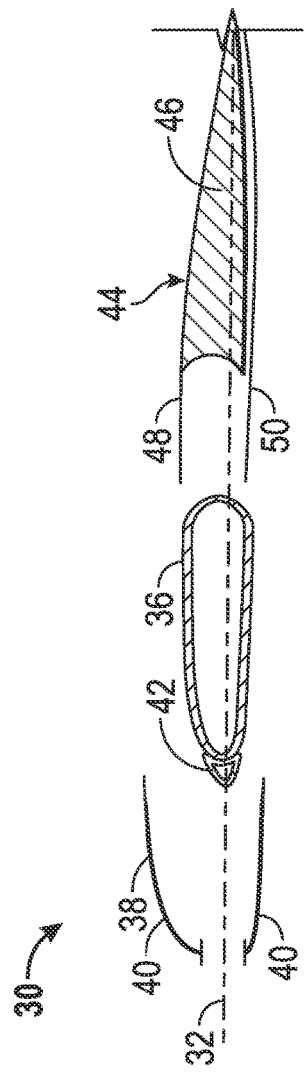
FIG. 2 is a cross-sectional view of an embodiment of a rotor blade.

Referring now to FIG. 2, an embodiment of the rotor blade assembly 30 includes a number of subassemblies arranged along a blade chord 32 extending along a blade assembly length 34 (shown in FIG. 1). The subassemblies include a center subassembly (i.e., a spar assembly 36), a leading edge subassembly 38, and a pocket subassembly 44. The spar assembly 36 includes a plurality of counterweights 42. The leading edge subassembly 38 includes a leading edge sheath 40. The pocket subassembly 44 includes a core 46, an upper skin 48 and a lower skin 50. While shown as three distinct assemblies, the number of assemblies and the construction thereof is not specifically limited.

To ensure the rotor blade assembly 30 is balanced within selected mass and moment requirements as a finished assembly, a procedure and apparatus is described herein to achieve a balance condition of each subassembly 36, 38, 44 such that when finally assembled into rotor blade assembly 30, no further balance procedures, such as a typically used whirl balance, is not necessary.

Figure 3:
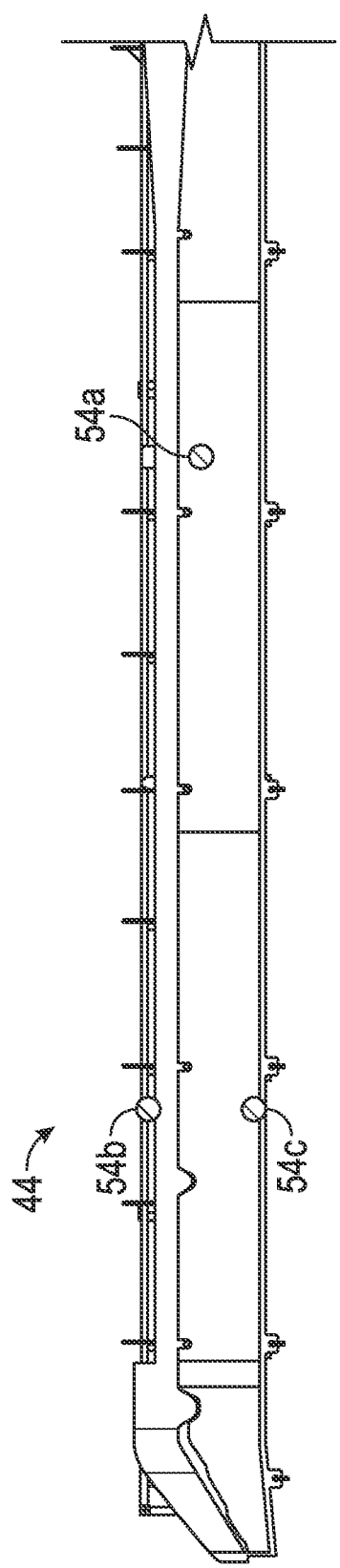
FIG. 3 is a plan view of an embodiment of a trailing edge pocket assembly for a rotor blade.
Figure 4:
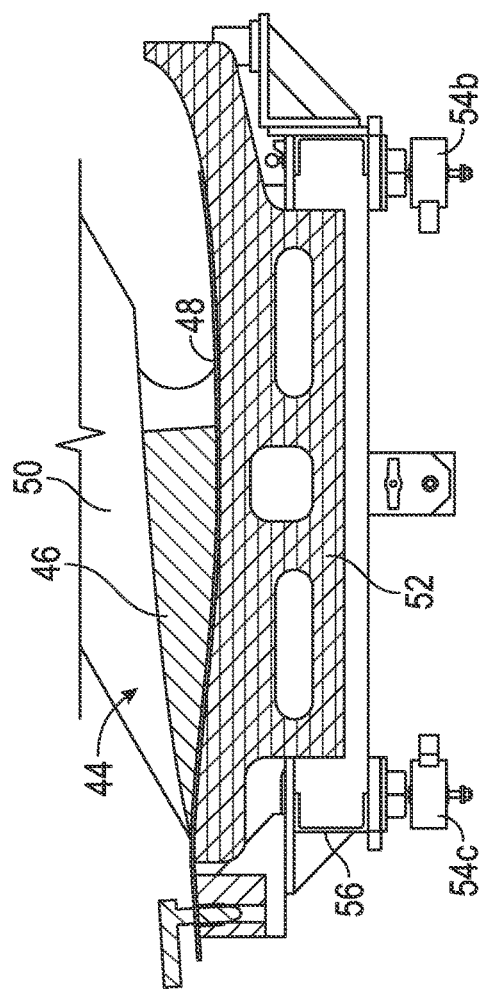
FIG. 4 is a cross-sectional view of an embodiment of a trailing edge pocket assembly for a rotor blade.

First, referring to FIGS. 3 and 4, the pocket subassembly 44 is balanced. The trailing edge pocket assembly 44 is loaded onto a pocket balance fixture 52, which is in contact with a plurality of load cells 54. In the embodiment shown, the loads cells 54 are secured to a balance table 56 to which the pocket balance fixture 52 is installed. Further, in this embodiment, three load cells 54 are utilized, but it is to be appreciated that other quantities of load cells 54 may be used to obtain the desired information. Referring to FIG. 4, the load cells 54 are arranged such that a first load cell 54a is radially inboard from a second load cell 54b and a third load cell 54c. The second load cell 54b and third load cell 54c are positioned at the same radial location, and are spaced in a chordwise direction. A moment of the trailing edge pocket assembly 44 is calculated from readings of load cells 54a, 54b, 54c. While not required in all aspects, the read out of the load cells 54a, 54b, 54c can be done by a computer connected to the load cells 54a, 54b, 54c through wired and/or wireless protocols, or read and manually entered into the computer.

In some embodiments, the moment is calculated on the computer or manually by Equation (1):

$$M_{TE}=R_1 \times F_{A1}+R_2 \times (F_{A2}+F_{A3}) \qquad (1)$$

Where:

$M_{TE}$ is the spanwise moment of the trailing edge pocket assembly 44;

$R_1$ is a radial distance of the first load cell 54a from the main rotor axis 20; and $F_{A1}$ is a force applied by the trailing edge pocket assembly 44 to the first load cell 44a.

Similarly, R2 is a radial distance of the second load cell 54b and the third load cell 54c from the main rotor axis 20; and $F_{A2}$ and $F_{A3}$ are forces applied by the trailing edge pocket assembly 44 to the second load cell 54b and third load cell 54c, respectively.

In Equation (1), the second load cell 54b and third load cell 54c are located at the same radial distance R2 whereas the first load cell 54a is located at a different radial distance R1. However, it is understood that the invention is not so limited and each of the load cells could be located at the same radial distance, or at three different radial distances as need be.

Figure 5:
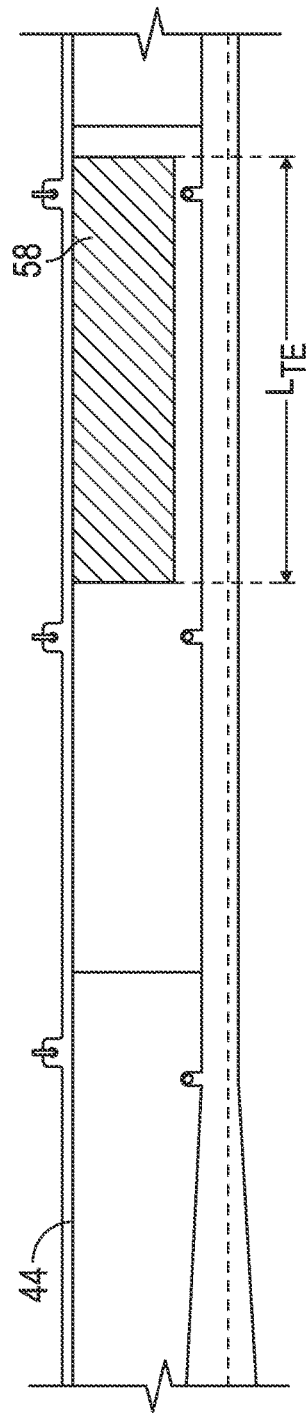
FIG. 5 is another plan view of an embodiment of a trailing edge pocket assembly for a rotor blade.

The calculated moment, $M_{TE}$, is compared to a target value $M_{TE-T}$. Depending on the results of the comparison, one or more actions are taken to add or remove mass of portions of the trailing edge pocket assembly 44 to counteract $M_{TE}$. Referring to FIG. 5, in some embodiments, the added mass is in the form of one or more structural film adhesive layers 58 to the trailing edge pocket assembly 44, which are then cured into the blade assembly 30. Each structural film adhesive layer 58 may be, for example, 0.006" in thickness and 15" in chordwise width. It is to be appreciated that, in other embodiments, other thicknesses and widths of structural film adhesive layers 58 may be used. A number of structural film adhesive layers 58 utilized and a spanwise length of each structural film adhesive layer 58 is determined by the result of the comparison between $M_{TE}$ and $M_{TE-T}$.

For example, $\Delta M_{TE}$ is defined as a $M_{TE}$ subtracted from $M_{TE-T}$. If $\Delta M_{TE}$ is within a first range, in some embodiments, between 0 and 35 inch-pounds, the trailing edge pocket assembly 44 is sufficiently balanced and no modification is required. If $\Delta M_{TE}$ is within a second range, in some embodiments between 35 and 288 inch-pounds, one structural film adhesive layer 58 is applied to the core 46. The structural film adhesive layer 58 has a spanwise layer length, $L_{TE}$, proportional to $\Delta M_{TE}$. In some embodiments, $L_{TE}$ is expressed as Equation (2):

$$L_{TE}=(144 \times \Delta M_{TE})/(t \times w \times r), \qquad (2)$$

where t=structural film adhesive layer 58 thickness;

w=structural film adhesive layer 58 width; and r=radial location of a spanwise center of gravity of the blade assembly 30.

The prescribed structural film adhesive layer 58 is then assembled to the core 46, centered about the radial location, r.

Further, if $\Delta M_{TE}$ is greater than 288 inch pounds, but less than or equal to 576 inch pounds, two structural film adhesive layers 58 are applied to the core 46, with $L_{TE}$ expressed as Equation (2) above. While described in terms of composite layers 58, it is understood that the invention is not so limited and that the mass can include weight cups in addition to or instead of the layers 58.

Figure 6:
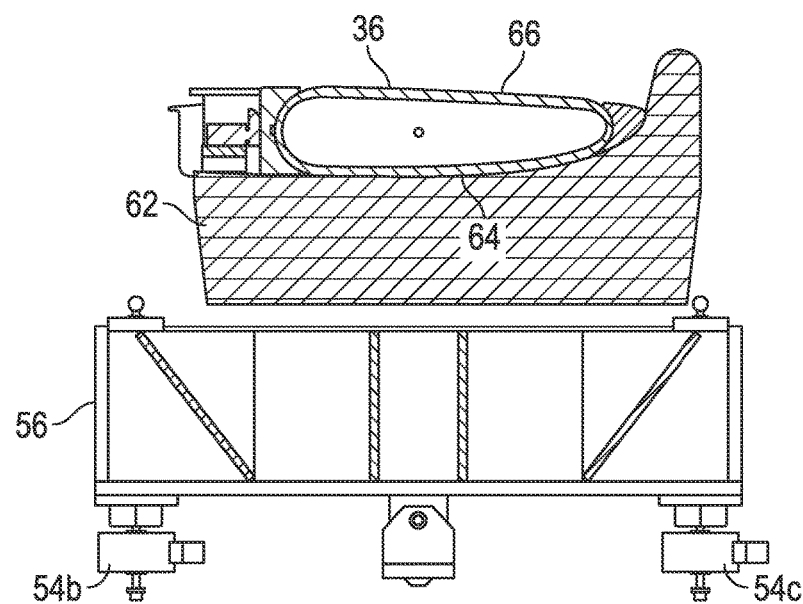
FIG. 6 is a cross-sectional view of an embodiment of a spar assembly for a rotor blade.

Referring to FIG. 6, the spar assembly 36 is similarly balanced. The spar moment, $M_S$, is obtained, either by using a spar balance fixture 62 or via other means. $\Delta M_S$ is calculated as a difference between a target spar moment, $M_{S-T}$, and $M_S$. In some embodiments, if $\Delta M_S$ is greater than or equal to zero, but less than 40 inch pounds, no structural film adhesive layers 58 are required to balance the spar assembly 36. If $\Delta M_S$ is greater than or equal to 40 inch pounds but less than or equal to 234 inch pounds, an structural film adhesive layer 58 is applied to a lower face 64 of the spar assembly 36. In some embodiments, the structural film adhesive layer has a width, w, of 10 inches. The length of the spar structural film adhesive layer, $L_S$, is expressed as Equation 3 below:

$$L_S=(144 \times \Delta M_S)/(t \times w \times r) \qquad (3)$$

The prescribed structural film adhesive layer 58 is then assembled to the lower face 64, centered about the radial location, r.

If $\Delta M_S$ is greater than 234 inch pounds, but less than or equal to 468 inch pounds, two structural film adhesive layers 58 with lengths $L_S$ are applied to the spar assembly 36, one structural film adhesive layer 58 at the lower face 64 and one structural film adhesive layer 58 at an upper face 66. Finally, if $\Delta M_S$ is greater than 468 inch pounds, but less than or equal to 937 inch pounds, two structural film adhesive layers 58 with lengths $L_S$ are applied to each of the lower face 64 and the upper face 66.

Figure 7:
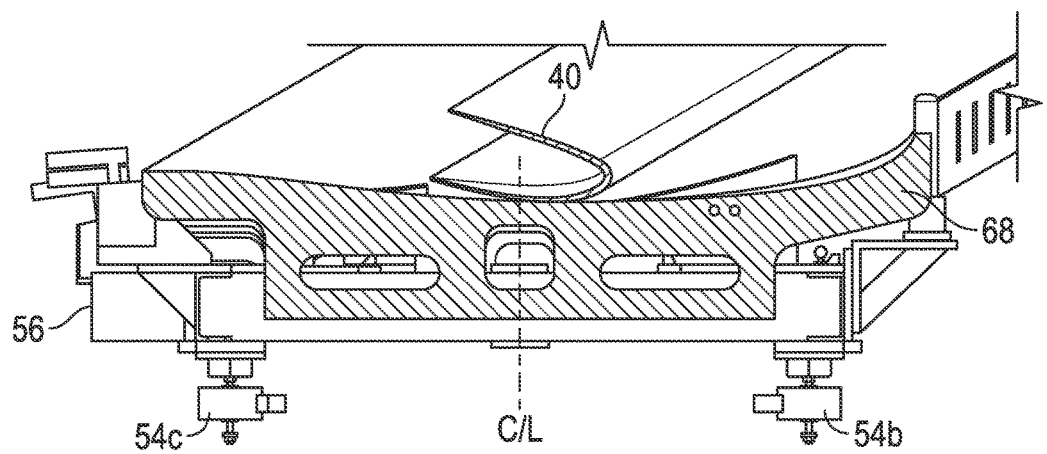
FIG. 7 is a cross-sectional view of an embodiment of a leading edge assembly for a rotor blade.

Similarly, referring to FIG. 7, the leading edge assembly 38, including the leading edge sheath 40 and the plurality of leading edge counterweights 42 is balanced. The sheath 40 is loaded onto a sheath balance fixture 68, which is in contact with the plurality of load cells 54. In the embodiment shown, the loads cells 54 are secured to the balance table 56 to which the sheath balance fixture 64 is installed. Further, in this embodiment, three load cells 54 are utilized, but it is to be appreciated that other quantities of load cells 54 may be used to obtain the desired information. A moment of the sheath 40 is calculated from readings of load cells 54a, 54b, 54c. In some embodiments, the moment is calculated by Equation (4) below:

$$M_{SH}=R_1 \times F_{A1}+R_2 \times (F_{A2}+F_{A3}) \quad (4)$$

Where $M_{SH}$ is the spanwise moment of the sheath 40.

Next, a total moment of the leading edge assembly 38 is calculated using $M_{SH}$ and moments of the leading edge counterweights 42, as installed to the spar 36 as Equation 5 below:

$$M_{LE}=M_{SH}+M_{CW} \quad (5)$$

Where $M_{LE}$ is the total moment of the leading edge assembly 38 and $M_{CW}$ is the moment of the leading edge counterweights 42. $\Delta M_{LE}$ is calculated as a difference between a target leading edge assembly moment, $M_{LE-T}$, and $M_{LE}$. Depending on the value of $\Delta M_{LE}$, leading edge counterweights 42 are removed from the spar assembly 36 to balance the leading edge assembly 38.

With each of the leading edge assembly 38, spar assembly 36 and pocket subassembly 44 balanced as individual components, they are assembled to form the rotor blade assembly 30, and since they are pre-balanced at the component stage, the rotor blade assembly 30 meets a target spanwise moment for the rotor blade assembly 30, and no further balancing of the rotor blade assembly 30 is required.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

While the invention has been described in detail in connection with only a limited number of embodiments, it should be readily understood that the invention is not limited to such disclosed embodiments. For instance, while described in the context of a composite rotor blade, it is understood that aspects could be used in non-composite material rotor blades, blades for wind turbines, ship propellers, and other like objects made of subassemblies and needing to be balanced. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed:

1. A method of assembling a rotor blade assembly comprising:
   determining a first spanwise moment of a first component of the rotor blade assembly;
   comparing the first spanwise moment to a target first spanwise moment;
   adjusting the first spanwise moment of the first component based on a result of the comparison to provide a balanced first component;
   determining a second spanwise moment of a second component of the rotor blade assembly;
   comparing the second spanwise moment to a target second spanwise moment;
   adjusting the second spanwise moment of the second component based on a result of the comparison to provide a balanced second component;
   assembling the balanced first and second components to provide the rotor blade assembly meeting a target spanwise moment of the rotor blade assembly, wherein:
   the first component comprises one of a leading edge assembly, a trailing edge pocket assembly, and a spar assembly; and
   the second component comprises another one of the leading edge assembly, the trailing edge pocket assembly, and the spar assembly.

2. The method of claim 1, wherein the adjusting the first spanwise moment comprises affixing one or more structural film adhesive layers to the first component.

3. The method of claim 2, wherein a number and/or size of the one or more structural film adhesive layers is determined by the result of the comparison of the first spanwise moment to the target first spanwise moment.

4. The method of claim 1, further comprising
   determining a third spanwise moment of a third component of the rotor blade assembly;
   comparing the third spanwise moment to a target third spanwise moment; and
   adjusting the third spanwise moment of the third component based on a result of the comparison to provide a balanced third component;
   wherein the assembling further comprises assembling the balanced third component with the balanced first and/or second component.

5. The method of claim 4, wherein adjusting the third spanwise moment comprises removing material from the third component.

6. The method of claim 1, wherein the first spanwise moment and/or the second spanwise moment are determined by placing the first component and/or the second component on a balance fixture comprising a plurality of load cells and reading the load at each of the load cells.

7. The method of claim 6, wherein the plurality of load cells comprises three load cells, and the determining comprises calculating the moment using Equation (1):

$$M=R1 \times FA1+R2 \times FA2+R3 \times FA3 \quad (1)$$

where:
M is the spanwise moment of the first or second component;
R1 is a radial distance of a first of the three load cells from a main rotor axis;
FA1 is a force applied by the first or second component to the first load cell;
R2 is a radial distance of a second of the three load cells;
FA2 is a force applied by the second component to the second load cell;
R3 is a radial distance of a third of the three load cells; and
FA3 is a force applied by the third component to the second load cell.

8. The method of claim 1, wherein adjusting the trailing edge pocket assembly spanwise moment comprises affixing one or more structural film adhesive layers to the trailing edge pocket assembly.

9. The method of claim 8, wherein a number and/or size of the one or more structural film adhesive layers is determined by the result of the comparison of the pocket spanwise moment to the target pocket spanwise moment.

10. The method of claim 1, wherein adjusting the leading edge assembly spanwise moment comprises removing material from the spar assembly.

11. The method of claim 10, wherein the material is one or more counterweights.

12. The method of claim 1, wherein the trailing edge pocket assembly spanwise moment and/or the spar spanwise moment are determined by placing the trailing edge pocket assembly and/or the spar assembly on a balance fixture comprising a plurality of load cells.

13. The method of claim 12, wherein the plurality of load cells is three load cells.

* * * * *

UNITED STATES PATENT AND TRADEMARK OFFICE
CERTIFICATE OF CORRECTION

PATENT NO. : 9,598,168 B2  
APPLICATION NO. : 14/033700  
DATED : March 21, 2017  
INVENTOR(S) : Leahy et al.

Page 1 of 1

It is certified that error appears in the above-identified patent and that said Letters Patent is hereby corrected as shown below:

On the Title Page

Item (72) Inventor is corrected to read:
-- Kevin P. Leahy, Naugatuck, (CT);
Frank Caputo, Cheshire, (CT);
Anthony Drago, Southbury, (CT) --.

Signed and Sealed this
Twenty-sixth Day of March, 2019

Andrei Iancu
*Director of the United States Patent and Trademark Office*